United States Patent [19]

Clarino et al.

[11] Patent Number: 5,831,857
[45] Date of Patent: Nov. 3, 1998

[54] PATTERN ALIGNMENT AND CUTTING SYSTEM

[75] Inventors: Thomas N. Clarino, East Haven; Mary McFadden Altshul, South Windsor, both of Conn.

[73] Assignee: Gerber Garment Technology, Inc., Tolland, Conn.

[21] Appl. No.: 525,919

[22] Filed: Sep. 8, 1995

[51] Int. Cl.[6] ................................................. G06F 17/50
[52] U.S. Cl. ............................. 364/470.06; 364/470.03; 364/470.05; 178/18; 345/179
[58] Field of Search .................... 364/470.01, 470.02, 364/470.03, 470.05, 470.06, 470.14; 178/18, 19; 382/111; 33/17 A; 250/559.45, 559.46; 345/179, 180; 348/88, 94; 356/238

[56] References Cited

U.S. PATENT DOCUMENTS

| | | | |
|---|---|---|---|
| 3,391,392 | 7/1968 | Doyle | 340/172.5 |
| 3,473,157 | 10/1969 | Little et al. | 340/172.5 |
| 3,534,396 | 10/1970 | Hart et al. | 235/61.6 |
| 3,596,068 | 7/1971 | Doyle | 235/150 |
| 3,693,154 | 9/1972 | Kubo et al. | 349/100 |
| 3,766,528 | 10/1973 | Ichida | 340/172.5 |
| 3,811,113 | 5/1974 | Saito et al. | 340/172.5 |
| 3,887,903 | 6/1975 | Martell | 340/172.5 |
| 3,895,355 | 7/1975 | Shorrock | 340/172.5 |
| 3,924,244 | 12/1975 | Seitz | 340/172.5 |
| 4,058,849 | 11/1977 | Fitzgerald et al. | 364/520 |
| 4,149,246 | 4/1979 | Goldman | 364/200 |
| 4,429,364 | 1/1984 | Maruyama et al. | 364/400 |
| 4,451,895 | 5/1984 | Sliwkowski | 364/521 |
| 4,539,585 | 9/1985 | Spackova et al. | 358/93 |
| 4,546,434 | 10/1985 | Gioello | 364/300 |
| 4,552,991 | 11/1985 | Hulls | 178/19 |
| 4,570,033 | 2/1986 | Hulls | 178/19 |
| 4,583,181 | 4/1986 | Gerber et al. | 364/470 |
| 4,598,376 | 7/1986 | Burton et al. | 364/470 |
| 4,621,959 | 11/1986 | Kishi et al. | 409/84 |
| 4,697,050 | 9/1987 | Farel et al. | 178/18 |
| 4,704,694 | 11/1987 | Czerniejewski | 364/513 |
| 4,725,961 | 2/1988 | Pearl | 364/475 |
| 4,739,487 | 4/1988 | Bonnet et al. | 364/475 |

(List continued on next page.)

FOREIGN PATENT DOCUMENTS

| | | |
|---|---|---|
| 0 182 144 A | 5/1986 | European Pat. Off. . |
| 0 338 964 A2 | 10/1989 | European Pat. Off. . |
| 0 332 765 A3 | 9/1990 | European Pat. Off. . |
| 0 512 338 A2 | 11/1992 | European Pat. Off. . |
| 1221349 | 4/1988 | France . |
| 4100534 C1 | of 0000 | Germany . |
| 4013836A1 | 10/1991 | Germany . |
| 85634A/89 | of 1989 | Italy . |
| 6-170786 | 6/1994 | Japan . |
| 7-205091 | 8/1995 | Japan . |
| 2050658 | 5/1979 | United Kingdom . |
| WO86/0667 | 11/1986 | WIPO . |

OTHER PUBLICATIONS

Lisa Cedrone, "CAD/CAM Marches On", pp.82–86, Bobbin, Jan. 1991.

*Manufacturing Clothier*, pp. 12,13, Oct. 1991, "CAD Developments".

*Primary Examiner*—Eric W. Stamber
*Attorney, Agent, or Firm*—McCormick, Paulding & Huber

[57] ABSTRACT

A pattern alignment system for use during the garment development process prior to the cutting operation includes a table with work surface. There is a digitizer located with the surface. The operator establishes a perimeter of a hide or other fabric piece that has been positioned on the surface with a stylus that presents position signals to a controller in real time. The controller has signals corresponding to a marker and further includes algorithms to compose the drawn lines or points into an electronic representation of the piece perimeter. Defects, textures or the like in the piece are identified in a similar manner. The system includes algorithms which enable the operator to reposition one or more garment segment patterns in the marker to avoid defects or otherwise optimize the segment position on the piece.

19 Claims, 5 Drawing Sheets

U.S. PATENT DOCUMENTS

| | | | |
|---|---|---|---|
| 4,744,035 | 5/1988 | Hashim | 364/470 |
| 4,758,960 | 7/1988 | Jung | 364/470.05 |
| 4,800,503 | 1/1989 | Pierce, Jr. et al. | 364/470.14 |
| 4,807,143 | 2/1989 | Matsurva | 364/468 |
| 4,853,715 | 8/1989 | Paschkis | 346/139 |
| 4,853,866 | 8/1989 | Andrada Galan et al. | 364/470 |
| 4,874,157 | 10/1989 | Jung et al. | 270/30 |
| 4,901,359 | 2/1990 | Bruder | 382/8 |
| 4,916,634 | 4/1990 | Collins et al. | 364/470.03 |
| 4,926,344 | 5/1990 | Collins et al. | 364/470.03 |
| 4,941,183 | 7/1990 | Bruder et al. | 382/8 |
| 4,961,149 | 10/1990 | Schneider et al. | 364/409 |
| 4,963,703 | 10/1990 | Phillips et al. | 178/19 |
| 4,982,437 | 1/1991 | Loriot | 382/8 |
| 5,027,416 | 6/1991 | Loriot | 382/8 |
| 5,068,799 | 11/1991 | Jarrett, Jr. | 364/507 |
| 5,089,971 | 2/1992 | Gerber | 364/470 |
| 5,172,326 | 12/1992 | Campbell, Jr. et al. | 364/470 |
| 5,175,806 | 12/1992 | Muskovitz et al. | 395/125 |
| 5,258,917 | 11/1993 | Bruder et al. | 364/474.13 |
| 5,341,305 | 8/1994 | Clarino et al. | 364/470 |

PATTERN ALIGNMENT AND CUTTING SYSTEM

TECHNICAL FIELD

The present invention relates generally to systems for use with the alignment in a marker of segments of fabric articles and geometric shapes and more particularly to computerized systems for accomplishing the same on an individual piece basis prior to the fabric cutting operation.

CROSS-REFERENCE TO RELATED APPLICATIONS

Some of the subject matter hereof is disclosed and claimed in the commonly owned U.S. Pat. No. 5,341,305; U.S. patent application entitled "Sample Garment Making System", U.S. Ser. No. 08/525,123 filed on Sep. 8, 1995; U.S. patent application entitled "Multipaneled Digitizer", U.S. Ser. No. 525,920 filed on Sep. 8, 1995, now U.S. Pat. No. 5,684,692 and U.S. patent application entitled "Method and Apparatus for Cutting Sheet Material", U.S. Ser. No. 08/525,412 filed Sep. 8, 1995 now U.S. Pat. No. 5,727,433 which are incorporated herein by reference.

BACKGROUND OF THE INVENTION

Computerized systems adaptable for use in making clothing or other fabric article are known in the art. Known systems include U.S. Pat. No. 4,546,434. The method disclosed in the '434 patent is utilized in visually composing and editing original apparel designs or patterns and includes the steps of providing a plurality of configurations of individual garment components, compiling a computer database from which the components may be retrieved and assembled in a finished apparel format on a figure outline in selected composite fashion, and if desired, modifying the apparel design by replacement of any component by a selection of a new element from the database by the use of an electronic locating instrument. Further, the design may be presented as a permutation of any one or more selected parts. When a design or pattern is completed, its component CRT image is made available in accordance with the '434 method as hard copy which can subsequently be used in cutting component parts comprising the design on suitable piece goods.

U.S. Pat. No. 3,596,068 discloses a system for optimizing material utilization. The '068 system automatically arranges patterns on a surface of a material in a manner which will require less material than which would otherwise be consumed by a human performing the same task. The simulated movement of each pattern piece about an established marker boundary is accomplished by data processing techniques. Once the contour of a piece outline and boundary outline is known and the slopes of the vertex connecting the segments are determined, the '068 system displaces the pieces within the boundary in a nonoverlapping manner.

U.S. Pat. No. 4,853,866 discloses a method and apparatus for matching panels to be cut from pattern fabrics. The '866 method and apparatus first defines matching points in each of several patterns of panels to be cut and digitizes the panels at these points so that the coordinates in respected identification codes for each of the points are recorded in memory. Matching relationships are then defined for the matching points which unequivocally fix the position which the design must be in at each of the matching points and records these relationships in memory. Thereafter, separation margins between the panels and distribution are established by the '866 method and apparatus, either automatically or interactively on the basis of the previously defined matching relationships.

A vision sensor is then automatically positioned over the spread pattern fabric which is to be cut in the positions of the matching points which have been defined for each one of the panels which have been distributed for cutting. The relative design position with respect to a reference position at each of the matching point positions is then determined and a position correction obtained for each panel with respect to the position initially assigned to each one of the panels to be cut. Each position correction is obtained on the basis of the positions of the pattern determined in the previous step and on the basis of the previously defined matching relationships wherein all of the panels which are to be cut are matched prior to proceeding with their cutting operation.

U.S. Pat. No. 4,149,246 discloses a system for creating custom garments of clothing by combining data on a personal tailoring measurements of the wearer, physical characteristics of the wearer, garment pattern and garment options selected on the basis of resulting combinations of personal pattern data. The '246 system is embodied with a central location unit including a cutting table apparatus, a memory and a pattern processing system. The central units serves a plurality of remote location equipments through a communication system. The remote equipments include an interactive graphic display wherein an operator can customize the garment. A garment pattern is first selected from memory. Personal physical data is supplied and the two forms of data are combined to provide a representative of the combination. Upon confirmation, the specific pattern data is processed to control a central location cutting table apparatus to provide the components which are sewn together to create the desired garment.

U.S. Pat. No. 4,058,849 discloses a system for converting a rough sketch into a finished drawing. In the '849 system, an electronic digitizing tablet or its equivalent is used to receive a roughly sketched object by an operator along with the desired final proportions which are entered into a stored table called a pointing sequence list (PSL) capable of storing all of the information required to define both the original form and the desired final configuration of the object. The PSL initially contains positional entries representing the coordinates of definitive points on the roughly sketched object and dimensional entries specifying the proportions which the object is to have in its final configuration. These are arranged in an order corresponding to a predefined pointing sequence which is followed by the operator when he enters the necessary items into the graphic information system. The PSL is subsequently converted to a new PSL by a rectifying procedure which modifies the coordinates of the previously entered points when necessary in order to effect the horizontal and vertical alignments of points ostensibly located on common, axially directed lines. Consequently, the '849 system is limited to rectifying a rough sketch into a preferred final geometry to eliminate undesirable irregularities from, for example, nonparallel lines.

The prior art contains several examples of computerized hide cutting systems. In U.S. Pat. No. 5,258,917 Bruder et al. discloses a method for nesting contours to be cut from a piece of natural leather in which defects in the material are detected by means of a camera. The device uses a movable pallet on which the hide is spread. The pallet is capable of being removed from the cutting bed and placed onto a scanning table before to imaging the hide. Subsequent to this, the pallet is placed back on the cutter table in a given registration with it, and cutting by the cutting tool is performed using the data of the scanned hide. Here, the pallet must be transported between the scanning table and the cutting table, and is not held down by vacuum pressure during such transportation which would otherwise prevent undesirable shifting or other relative movement of the hide.

The patent to Bonnet, U.S. Pat. No. 4,739,487, discloses using a computer generated video projection for displaying on a hide or skin the pattern pieces laid out in the manner as they will be cut. The operator electronically fits each of the images of the cut pieces within the contour of the skin using the computer controller by viewing the projected pattern piece as they appear on the hide. This data is then used to control the subsequent cutting operation.

However, prior art system are not well suited for use with hides, appliqués or fabrics having defects. With these applications, the operator needs to adjust the position of the garment pattern segments in the marker to avoid problem areas. Moreover, the location of defects, etc. in the fabric or hide vary with each piece and therefore the adjustments cannot be preprogrammed or otherwise approximated in advance. It would be advantageous to have a system which allows for the adjustment of the position of a geometric shape in the form of a garment pattern segment in a marker for each hide or piece of fabric in order to compensate for the presence of defects or flaws. The present invention is drawn towards such a system.

SUMMARY OF INVENTION

An object of the present invention is to provide a pattern alignment and cutting system for use during the cutting process capable of altering the position of pattern segment signals in a marker signal database.

Another object of the present invention is to provide a pattern alignment and cutting system of the forgoing type capable of tracing the outline of a hide, shape or fabric piece and any blemish or defect therein while vacuum is applied to the same to hold position Still another object of the present invention is to provide a pattern alignment and cutting system of the forgoing type that maintains registration between a shape being positioned by the operator, the hide or fabric material being cut and a support table.

Another object of the present invention is to provide a pattern alignment and cutting system of the forgoing type that includes a controller to lay out geometric shapes, appliqués or other garment segments about identified defects or as desired by the operator within the outline of the material to maximize utilization.

According to the present invention, a system for use in aligning a fabric pattern segment located in a preferred position in a marker database to an adjusted position includes a fabric cutting surface adapted to receive a fabric section. There is a digitizing panel in substantial registration with the surface and a digitizing apparatus capable of manipulation relative to said supporting surface. The digitizing apparatus further includes circuitry for generating digitizing excitation signals as the digitizing apparatus is moved over said work supporting surface in proximity thereto. There is an electrical circuit associated with the digitizing panel for producing position signals representing the position of the digitizing apparatus relative to the surface. A controller is included for receiving the position signals and has a memory for storing positional information in the marker database. The controller also has an apparatus for aligning a geometric reference positions with a corresponding landmark position on the fabric piece. There is an apparatus for receiving signals indicative of a position of a defect in the fabric piece and for establishing a position of the defect within the marker relative to the fabric pattern segment. Also included is a segment adjustment mechanism for generating signals to adjust the position of the fabric segment within the marker in dependence on received adjustment command signals.

DESCRIPTION OF THE PREFERRED EMBODIMENT

A pattern maker or designer of a garment or other fabric article creates a pattern in several ways, including a freehand sketch, a pattern from an existing garment or by working from fabric which has been draped on a dress form or fit model. As used herein, each "pattern" is comprised of a plurality of "pattern segments" corresponding to sleeves, pockets, etc. "Pattern" also includes disconnected shapes, embroiding designs, appliqués and the like applied to the garment or fabric article. Together the pattern segments are used to make a single garment or fabric article. In addition, those skilled in the art will note that the term "fabric" or "hide" as used herein are merely examples of a larger class of materials referred to in the industry as limp sheet material. Accordingly, the use of examples herein are understood to be exemplary and not limiting.

For example, during the creation of a garment pattern, lines representing a garment pattern segment can be drawn using rulers, curve templates or by drawing curves freehand. Each segment is then separately lifted off by tracing and cutting the individual garment pattern segments from a separate sheet or sheets of paper. The segments shapes are usually altered when integrating manufacturing standards into the design.

Once the development process is finished, the garment pattern segments can be digitized by known systems, such as the Accumark system marketed by Gerber Garment Technology (GGT), the assignee of the present invention. By either process, the digitized signals showing the relative location of the garment pattern segments on a hide or on an individual piece of fabric comprise a part of the marker.

With the Accumark system, a predrawn and/or cut garment pattern segment is taped or pinned onto a digitizing tablet and thereafter, the perimeter is input using a digitizing puck or its equivalent. Alternatively, the design and digitizing processes can be combined by the use a computerized pattern development system capable of direct designer input as described in U.S. Pat. No. 5,341,305. With that system, the designer draws lines of a garment pattern segment on a sheet placed on a work surface with a stylus that enables the digitizer to present position signals to a controller in real time. The controller includes algorithms to compose the drawn lines into a garment segment pattern as well as compensate for human errors such as multiply drawn lines and missing line portions. The '305 system is transparent to the designer in operation as it adapts to the person rather than forcing the designer to adapt to the system.

Figure 1:
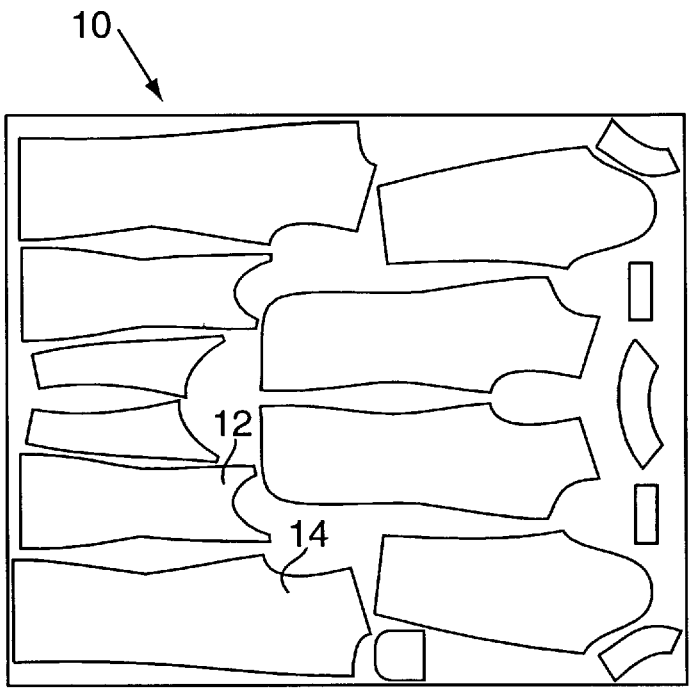
FIG. 1 contains a simplified schematic illustration of two garment pattern segments within a marker used with a system provided in accordance with the present invention.

Shown schematically in FIG. 1 is a portion of a marker 10 containing signals for garment pattern segments 12 and 14. The illustration of FIG. 1 shows the relative position of the garment segments in a preferred location in the marker corresponding to a preferred location on the hide or fabric piece. However, certain applications such as a hide or fabric that has imperfections presents variations in piece quality which cannot be anticipated in advance. If the garment segments were located exactly at the preferred location, the resultant article may include these imperfections, rendering the final article unsaleable. It is therefore desirable to reposition one or more of the segments in the marker after the layup and examination of the individual hide or fabric piece. Similarly, there are applications in which the marker is created, at least to some extent, as the hide or fabric piece lays on the cutting table. Geometric shapes, appliques and the like are sometimes best located on the garment or material directly by the designer-operator after an examination of the material. The final preferred, position of one or more of these shapes may be substantially at variance with the initial position. As used herein, a marker or model can be simply a collection of pattern segments as well as an ordered array of pattern segments.

Figure 2:
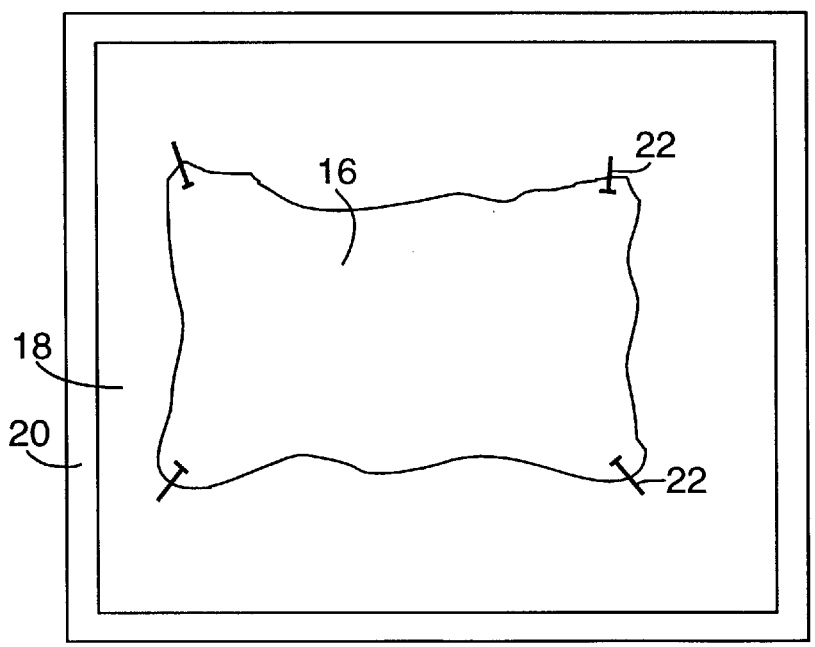
FIG. 2 is a simplified schematic illustration of a digitizing surface used by the present system with a hide placed thereon.

In FIG. 2 there is shown a simplified illustration of a hide 16 mounted on a surface 18 of a cutting table 20 as used with a system provided according to the present invention. The hide is located by conventional means, such as by pins 22 that stretch the hide across the surface. Preferably, the table has a digitizing capability with sensors (not shown) underlaying the table surface to be activated by a stylus or puck. There is a digitizing panel located in registration with the surface which is comprised of a grid of sensor elements receptive to electrical signals. Upon receipt of an appropriate electrical signal, the grid generates a corresponding position signal. The grid can be comprised of overlapping sections, as disclosed in the commonly owned copending U.S. patent application entitled "Multipaneled Digitizer U.S. Ser. No. 08/525,920 filed on Sep. 8, 1995 now U.S. Pat. No. 5,684,692. The signal redundancy created by the simultaneous excitation of overlapped elements is removed during signal processing. Also, a vacuum is applied in certain embodiments to hold the hide taut to the surface of the table.

Figure 3:
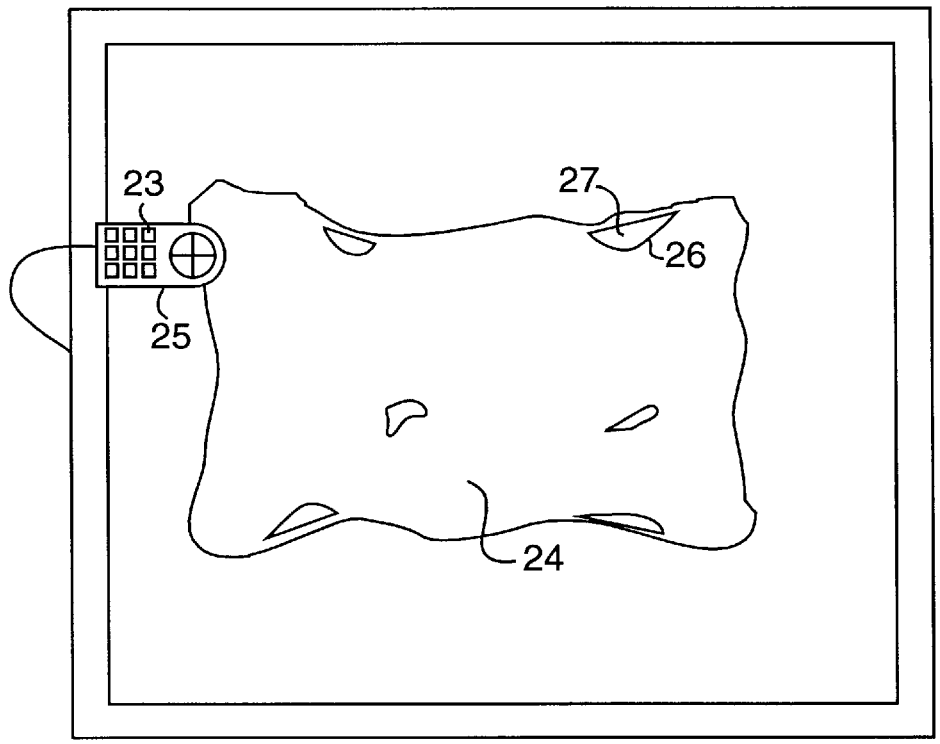
FIG. 3 is a further illustration of the hide of FIG. 2 showing the use of a puck in digitizing the hide perimeter.

As shown in FIG. 3, the cutting table is configured so that hide perimeter 24 can be digitized in a conventional manner by the use of a digitizer means such as a puck or pen stylus. A digitizing puck 25 is manually moved about the surface along the perimeter of the piece. Selected points or line segments therealong are picked off by activation of appropriate switches 23 on the puck. The system is configured to create a digital image of the piece/hide perimeter and store that image in a database along with images of the garment pattern segments and other geometric shapes which comprise the marker. These stored images can be manipulated by a computer to compose a garment of selected images as well as grade these images for different sizes.

In those applications in which an irregularly shaped material is to be cut (e.g., hide), signals indicative of an overall hide perimeter are generated by the operator demarking a series of points using a digitizing stylus or puck. Signals indicative of the relative location of these points are configured by system algorithms to form a perimeter outline. The pattern segments in the marker are arranged by the present system to fit within this perimeter. The present system checks the garment pattern segment location with respect to the outline and ensures that the segments are within the desired region. Feedback as to the exact location of a segment is provided to the operator by means of cursor location on the screen versus stylus or puck location on the material. A cutting tool is thereafter used to cut the hide in place.

Most hides are characterized by a plurality of flaws or defects whose size and location vary from hide to hide and cannot be anticipated in any meaningful way. The present system is characterized by the capability of further digitizing an outline of the portion(s) of the hide which is defective or undesirable. The operator selects an edit mode, and uses the digitizing instrument to manually generate a perimeter outline 26 as set forth above for each defect 27, usually after the overall outline of the hide has been generated. Once the location of the defect is registered in the marker, the present system can automatically reposition one or more pattern segments in the marker to avoid the defect and yet stay within the material. Alternatively, the segment can be manually moved to a new location.

Figure 4:
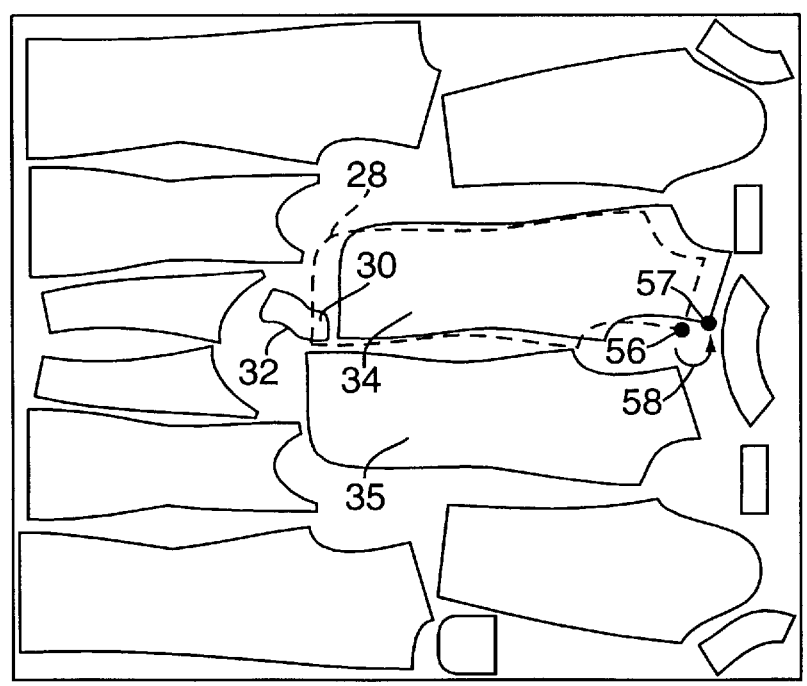
FIG. 4 is a simplified schematic illustration of the marker of FIG. 1 with one garment pattern segment moved to avoid a defect.

As shown in FIG. 4, the garment pattern segment has a preferred location 28 in the marker indicated by the dashed line. However, a simple visual analysis of the hide has revealed that the preferred location would incorporate a portion 30 of defect 32. Accordingly, the present system allows for the adjustment of the position of the garment segment pattern in the marker to avoid the defect entirely. The adjusted position is represented by perimeter 34. The adjusted position is arbitrarily selected by the operator with the hide on the table, but the system will not allow the operator to move the segment 34 to abut or overlap segment 35.

Figure 5:
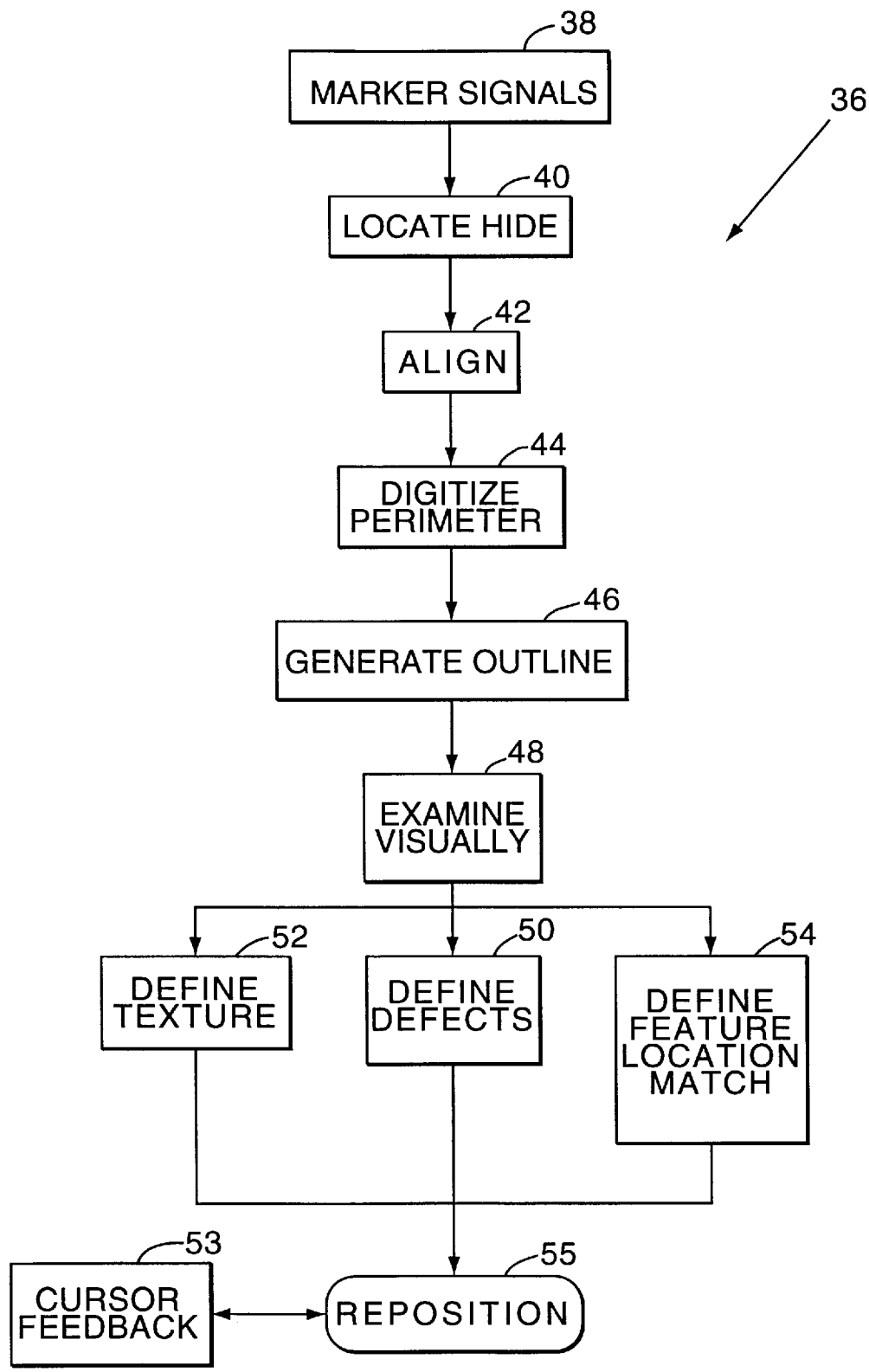
FIG. 5 is a diagram showing an algorithm executed by the controller in the system of FIG. 6.

Operation of the present system to move the garment segment pattern within the marker is accomplished using an algorithm 36 provided by the present system which is diagrammatically presented in FIG. 5. Initially, the system receives signals indicative of a marker with the garments segments configured at a preferred location (block 38). The hide is placed on the cutting digitizing surface (block 40). In the preferred embodiment, the surface is a flat cutting table.

The marker is adjusted to an initial reference position so that the garment pattern segments are placed in a preferred location on the material. This initial alignment (block 42) is accomplished by determining the orientation of the hide as it lays on the table as compared to a reference position in the marker. A landmark on the hide is selected in this process with digitizing puck or stylus. This adjustment allows for the alignment of the X and Y axes of the coordinate data. For example, registration of the X axis of the hide with the X axis of the coordinate data allows for marker alignment with the grain of a hide.

For many fabrics their intrinsic patterns have a certain amount of skew from an ideal which must be compensated for prior to cutting. The alignment step of the present system allows for compensation for each fabric as it is placed on the cutting table. In many systems the operator slews a cutting gantry to an origin and generates a reference signal indicative of the same. Other equivalent techniques can be used, for example, a visual representation of a marker reference point (i.e. origin) on the hide can be denoted to the system by the operator.

Signals indicative of the perimeter of the hide or fabric are generated at block 44 by generating a position signal as the digitizing tool is moved to several locations about the hide perimeter. The system thereafter composes the several discrete signals into a smooth outline (block 46). The hide is examined visually for flaws (block 48) by the operator which are defined by use of the digitizing tool in a manner similar to that used to identify the defect perimeter (block 50).

A similar perimeter generation process is used for those instances where the operator wishes to manually place a shape or an appliqué on the garment or fabric. Once the system has been placed in an operational mode that allows for creation, e.g., "create", the stylus or puck is moved to several locations about the shape perimeter, with the operator generating position signals at each one, and defining an anchor or reference position.

With the present system, it is also possible to define the irregularities throughout the length and width of the fabric or hide along the X and Y axis on the surface. This capability of the present system is useful in situations where the fabric has a feature which may be skewed as it lays on the table or where texture matching would yield a higher quality garment (block 52). In addition, the position of predefined shaped pieces relative to the designs within the fabric or media piece as that piece lays on the surface can be also defined or redefined as desired (block 54). This would include appliqués, plaid or stripe matching, floral or other design matching and lace location.

Figure 7:
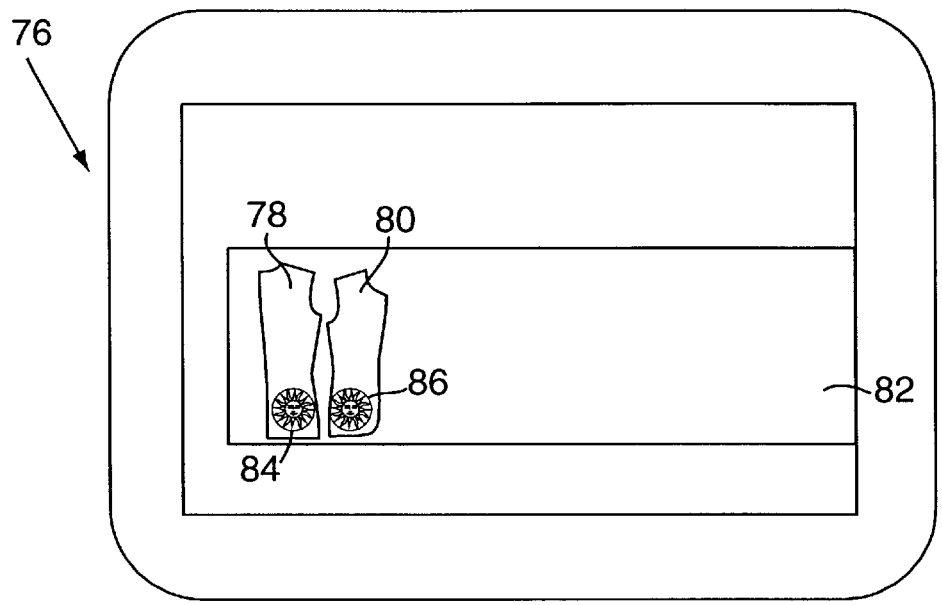
FIG. 7 is a simplified schematic illustration of a display image generated by the system of FIG. 6.
Figure 8:
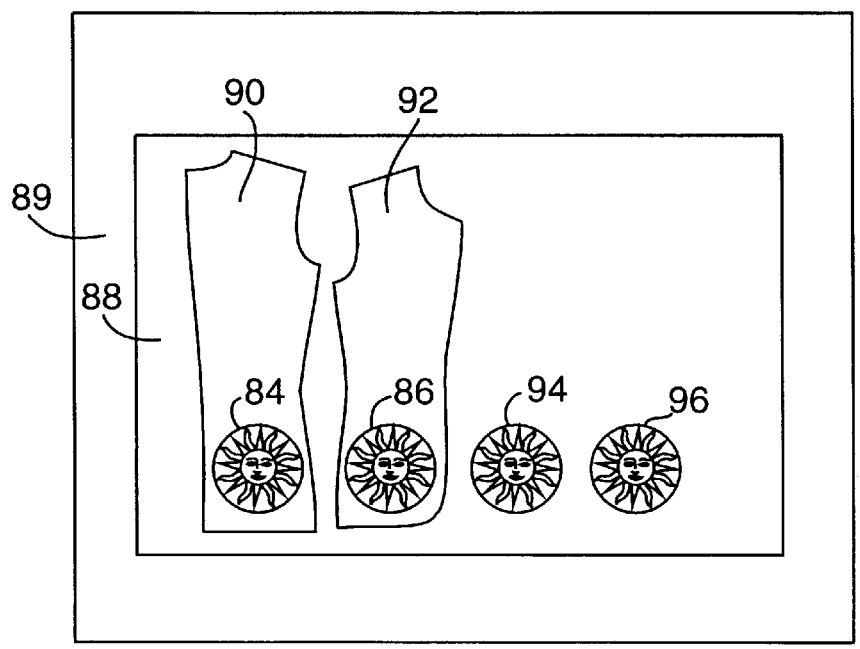
FIG. 8 is a simplified schematic illustration of a fabric piece on a cutting table of the system of FIG. 6.

An example of this process can be seen by way of reference to FIGS. 7 and 8. Shown in simplified form in FIG. 7 is an image 76 on the system display illustrating two adjacent garment pattern segments 78, 80 in an image of a marker 82. In addition to positional information, the system display can provide instruction signals and operational status information. For example, a portion of the display device may be devoted to the display of an instruction menu consisting of a plurality of operator instructions. Also shown within the segments are images 84, 86 of a fanciful sun design. A view of a fabric piece 88 on a cutting table 89 is shown in schematic form in FIG. 8. Cut panels 90, 92 corresponding to the pattern segments are also visible, with sun designs 94, 96 lying adjacent to the cut panels.

The operator then repositions the segment in the marker (block 55). This can be done by "attaching" the segment to the stylus or puck. The operator selects an operational mode that provides for segment repositioning (e.g. "move") and then moves the stylus (and hence the dislay cursor) to the location of the "anchor" or reference position and "clicks" on the same; causing the system to attach the segment to the stylus so that the segment reference point moves with the stylus about the cutting table. When a new position has been selected, the operator simply "clicks" with the stylus at that location on the table. The cursor position is displayed visually to the operator on the display to provide cursor feedback (block 53). Both new and old positions can be shown to the operator, as well as the positions of the other segments and defects. Thereafter, the system can analyze the new marker segment configuration for conflicts in the manner noted above.

Referring again to FIG. 4, the repositioning process is preferably accomplished by using the stylus or puck in a "drag and drop" mode. Each garment pattern segment is comprised of several "key" or landmark points which can be used to reposition the segment in the marker in an "edit" or "modify" mode. To use this feature of the present invention, the operator selects the modify function of the system and manually places the stylus in registration with one of these landmarks points. Thereafter, the point is selected with the stylus. The stylus is positioned over the desired location of the landmark point represented as point 56. The system then generates signals to reposition the garment pattern segment in the marker with each original point in the segment displaced in accordance with the vector 58 formed by the different locations of the original and final landmark position 59. Note that the garment pattern segment may be moved in an arbitrary manner, including rotation about an edge or center point as well as displacement and including any combination of the foregoing. The only limitation is the position of adjacent garment pattern segments. The present system will not allow a garment pattern segment to be moved to abut or overlap an adjacent segment.

An important feature of the present invention in the preferred embodiment is the use of a dual digitizing and cutting table, rather than a prior art digitizing drum. The present system is directed towards a combination of manual inspection and placement of garment pattern segments within the marker with digital reproducibility in contrast to prior art systems which simply digitize the outline or perimeter of the piece. While some known systems allow the engineer to use a computer screen to rearrange elements within the marker, these adjustments are made in a context that is divorced from the cutting environment. No known system even hints of the need for adjusting for defects found in each individual piece or the desirability of custom positioning of pattern segments in certain applications.

The known processes by which a marker is first generated and then aligned to a given hide or fabric piece are undesirable for several reasons, including the lack of flexibility in dealing with individual pieces. Moreover, what is lost with these prior art computerized systems is the tactile feel of the worker in properly placing pattern segments on the actual fabric or hide when positioned on the table. An individual hide has many variations in texture, thickness, grain and the like which will motivate the worker to manipulate or move entirely a garment pattern segment about the piece to avoid defects. Equivalently, there are esthetic reasons which call for custom positioning of these pattern segments. For example, in making a suede coat which includes a front pocket, it would be preferable to have the leather textures for both the panel and pocket in alignment.

The present system provides the worker with almost infinite flexibility in positioning the garment pattern segments relative to the hide. This is true regardless of whether the individual piece is a hide or a fabric that may need to have lace position upon it, or a fabric where stripes or plaids must be accurately matched on adjacent panels or sleeves.

Figure 6:
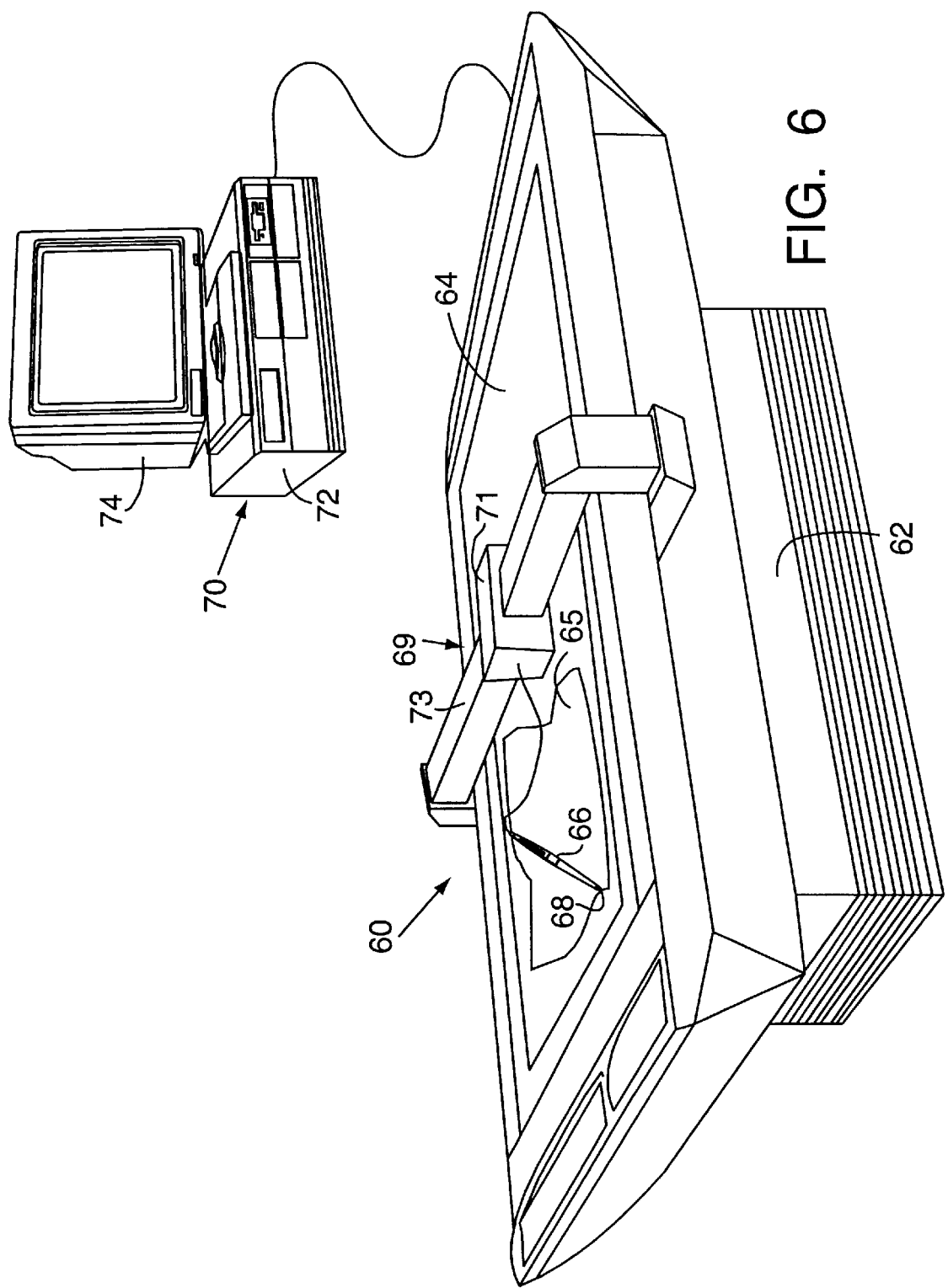
FIG. 6 is a simplified schematic illustration of an alignment and cutting system provided in accordance with the present invention.

Referring now to FIG. 6, there is schematically shown a pattern alignment system 60 provided according to the present invention. The present system can be used as a stand-alone unit or as a supplement to an existing garment piece database manipulation system. The system comprises a large cutting table 62 as described in the above referenced copending U.S. patent application entitled A Multipaneled Digitizer, Ser. No. 08/525,920 filed Sep. 8, 1995 now U.S. Pat. No. 5,684,692 and is configured with an internal digitizer grid that extends parallel to the plane of work surface 64. The size of the table is selected in accordance with the wishes of the designer, but is typically large enough to accommodate the pattern segments (e.g. input surface 66"× 48", 44"×36" through 12"×12") and the individual hides and/or fabric pieces shown as hide 65. The digitizer is preferably a multipaneled unit as described in the above referenced copending U.S. patent application entitled A Multipaneled Digitizer, Ser. No. 08/525,920 filed Sep. 8, 1995 now U.S. Pat. No. 5,684,692 built by the Numonics Corp. of Montgomeryville, Pa. and may have a backlight, if desired. In the preferred embodiment a vacuum is drawn though the surface to assist in fixedly locating the hide.

A stylus 66 is included and is characterized by a point 68. The stylus may be cordless and may also have a graphite insert for drawing a visible line, and further comprises a manually selectable switch which enables signals to be presented to receiving elements in the table in a known manner to digitize the position of the stylus as it is moved about the work surface. The present surface may be adapted for a combined digitizing and cutting operation and may include a flat, air permeable cutting surface beneath which is the digitizing grid. The grid is sensitive to radio frequency (RF) or other type of energy from the stylus transmitter through the hide piece. Above this support/cutting surface is provided a typical coordinate controlled cutter 69 for cutting pieces out of hides. The cutter includes a cutting head 71 suspended from a beam 73 in a known configuration and is driven by a standard controller which is also linked to the digitizing grid.

The present system further comprises a controller 70 programmed in accordance with algorithms detailed hereinabove. The controller preferably comprises a 80486 type 32 bit processor, a 32 bit mathematics coprocessor, 4 Mbytes of internal memory and 40 Mbytes of storage. A 1.2 Mbyte diskette is provided as well, as is other conventional components need to configure the controller to operate with a MS-DOS operating system such as a keyboard and printer An alternative embodiment includes a workstation having a RISC processor with a UNIX operating system. Also included in certain embodiments is a system management workstation 72 with a video display 74 which allows for a video representation of the marker and pattern segments in their relative position and which shows the operator the location of the repositioned segment in the marker. Preferably, the table and stylus receiver unit (not shown) plug into a "mouse" port on the controller for receiving data in serial format.

Similarly, although the invention has been shown and described with respect to a preferred embodiment thereof, it should be understood by those skilled in the art that various other changes, omissions and additions thereto may be made therein without departing from the spirit and scope of the present invention.

We claim:

1. A pattern alignment and cutting system for for adjusting the position of a pattern segment within a marker database and thereafter cutting a sheet of limp sheet material mounted on a cutting surface said system comprising;

a digitizing panel located with and in substantial registration with said cutting surface, said cutting surface being associated with a cutting table;

a hand-held digitizing means capable of manual manipulation relative to said cutting surface, said digitizing means and said digitizing panel cooperating for producing position signals representing the position of said digitizing means relative to said cutting surface;

a controller receiving said position signals and having a memory means for storing the marker database, said controller including a means for aligning a marker reference position with a corresponding landmark position in said sheet of limp sheet material;

a means for receiving signals indicative of a position of a selected form in said sheet material piece and establishing a form position within said marker database relative to said pattern segment;

a segment adjustment means for generating adjustment command signals and for adjusting the position of said pattern segment relative to said form position within said marker in dependence on said adjustment command signals and;

a cutter for cutting the sheet of limp sheet material in accordance with said adjusted position of said pattern segment.

2. The system according to claim 1 further comprising a graphic display device connected with said controller for visually displaying selected ones of said position signals as well as said instruction signals and signals indicative of the operational status of the system.

3. The system according to claim 1 further comprising an input means for the manual input of instruction signals to an enabling means for selectively enabling generation of position signals.

4. The system according to claim 3 wherein said controller includes a composing means for forming said position signals into a geometric figure within said marker database.

5. The system according to claim 4 wherein said figure corresponds to a perimeter of the sheet material piece.

6. The system according to claim 4 wherein said figure corresponds to a perimeter of a defect within or contiguous with said sheet material piece perimeter.

7. The system according to claim 4 wherein said digitizing means comprises a digitizing puck.

8. The system according to claim 1 wherein said controller further comprises a means for enabling said digitizing means to generate said adjustment command signals.

9. The system according to claim 1 wherein said cutting surface is air permeable and wherein said system further comprises a means for drawing a vacuum through said cutting surface.

10. The system according to claim 9 wherein said digitizing panel is positioned beneath said vacuum drawing means and in electrical communication with said digitizing means when said digitizing means is located in close proximity with said cutting surface.

11. The system according to claim 10 wherein said digitizing panel is further comprised of a series of electrically sensitive grids having a portions thereof overlap an adjacent grid and wherein said controller further comprises a means for receiving signals from said grids and compensating for redundant signals from said overlap grid portions.

12. The system of claim 1 wherein, subsequent to the generation of signals to adjust the position of said sheet material pattern segment, said controller further comprises a means for repositioning said sheet material pattern segment within said marker database at a new orientation in accordance with a computed vector from pattern orientation signals generated by said digitizing means being brought first into proximity with a selected point of a pattern segment perimeter and then to a second point on said cutting surface corresponding to a subsequent position of said pattern segment perimeter within said marker database.

13. The system of claim 12 wherein said controller further comprises a means for presenting signals to a graphic display device corresponding to a video image of said sheet material pattern segment configured to approximate the new orientation thereof on said cutting surface relative to said marker database.

14. A system according to claim 13 wherein said controller further comprises a manual input means to cause a portion of said display device to be devoted to the display of an instruction menu consisting of a plurality of operator instructions each located in a separate area of the display device and for causing a portion of said digitizing panel in registration with said cutting surface to be related to the menu displayed by said display means whereby a desired instruction provided by said menu may be input to said controller by touching said digitizing means to the area of said cutting surface associated with one of the instructions.

15. The system of claim 12 wherein said controller repositioning means further comprises a means for providing manual selection and movement by the operator of a pattern segment within said marker database.

16. The system of claim 1 wherein said digitizing means is further characterized by a finger operated switch.

17. The system of claim 1 wherein said digitizing means further comprises a means for leaving a drawn line on said cutting surface.

18. A method for adjusting the position of a pattern segment within a marker database and thereafter cutting a sheet of limp sheet material, said method comprising the steps of:

placing the sheet of limp sheet material on a flat cutting surface of a cutting table;

locating a digitizing panel with said cutting surface for substantial registration therewith;

providing a hand-held digitizing means capable of manual manipulation relative to said cutting surface, said digitizing means and said digitizing panel for cooperatively generating position signals representative of the position of said digitizing means relative to said cutting surface when said digitizing means is moved over said cutting surface in proximity thereto;

inputting position signals to a controller memory representing the position of said digitizing means relative to said cutting surface indicative of the perimeter of said sheet of limp sheet material;

providing a controller memory means storing the marker database, aligning a marker reference position with a corresponding landmark position on said cutting surface;

receiving signals indicative of a position of a selected form in said sheet of limp sheet material and establishing a form position within said marker database relative to said pattern segment; and generating signals to adjust the position of said pattern segment relative to said form position within said marker database in dependence on received adjustment command signals.

19. The method of claim 18 further comprising the step of inputting to said controller modification instruction signals to modify the location in said marker database of a pattern segment by an amount and orientation selected by an operator.

* * * * *

UNITED STATES PATENT AND TRADEMARK OFFICE
CERTIFICATE OF CORRECTION

PATENT NO. : 5,831,857
DATED : November 3, 1998
INVENTOR(S) : Thomas N. Clarino, Mary McFadden Altshul It is certified that error appears in the above-identified patent and that said Letters Patent is hereby corrected as shown below:

Column 9, line 50
In Claim 1, line 1, after "cutting system", please delete "for". (2nd occurrence)

Signed and Sealed this

Thirtieth Day of March, 1999

Attest:

Q. TODD DICKINSON

*Attesting Officer*   *Acting Commissioner of Patents and Trademarks*